July 7, 1970        H. M. FERRARI        3,519,537

INTERNAL GAS ADSORPTION MEANS FOR NUCLEAR FUEL ELEMENT

Filed Feb. 2, 1968

WITNESSES

Robert C. Baird

Lee P. Johns

INVENTOR
Harry M. Ferrari.

BY
Frederick Shoop
ATTORNEY

3,519,537
INTERNAL GAS ADSORPTION MEANS FOR NUCLEAR FUEL ELEMENT
Harry M. Ferrari, Pittsburgh, Pa., assignor to Westinghouse Electric Corporation, Pittsburgh, Pa., a corporation of Pennsylvania
Filed Feb. 2, 1968, Ser. No. 702,631
Int. Cl. G21c 3/02
U.S. Cl. 176—68                                        4 Claims

ABSTRACT OF THE DISCLOSURE

An improved fuel element having a controllable internal pressure, for a neutronic reactor including an elongated hermetically sealed tube, a plurality of bodies of fissionable material within the tube and forming a clearance space therewith, and a body of a high surface area monatomic gas adsorber, such as activated charcoal, within the tube for adsorbing fissionable product gases.

BACKGROUND OF THE INVENTION

Field of the invention

This invention relates to a fuel element for a nuclear reactor and more particularly it pertains to a sealed fluid-tight fuel element composed of a metal tube which contains fissionable material as well as a body of monatomic gas adsorber of fissionable product gases.

Description of the prior art

Most of the power reactor fuel elements currently in use consist of a refractory ceramic fuel contained within a sealed thin walled tubular sheath that is disposed in an ambient pressurized water atmosphere. The thin walled tubular sheaths must maintain their structural integrity during long term operations at high temperatures. One limitation to such fuel elements is the production of fission product gases from the fuel which gases exert an internal pressure within the fuel element sheath.

The problem is particularly acute because of cyclical operations of a power reactor over a given period of time such as 24 hours which result in extreme variations in temperature and pressure internally as well as externally of the fuel element. More particularly because of differentials in external and internal pressure the sheath encasing the fuel element is subjected to premature failure and rupture due to fatigue strain of the metal forming the sheath or cladding.

Some reactors are gas cooled and employ fuel element sheath or cladding composed of a relatively porous non-metallic material such as graphite as is disclosed in U.S. Pats. 3,141,829 and 3,356,586. Such fuel elements of course do not encounter the problem of large differences between internal and external pressures because, among other things, the graphite sheath is porous and enables the escape of the fission product gases such as xenon and krypton, from the interior of the fuel element. Accordingly, there is no need to provide gas pressure control means within a fuel element having a graphite sheath or cladding for minimizing the internal gas pressure occurring from the gradual build-up of fission product gases.

The fuel elements for pressurized water reactors require a metal sheath or cladding which is hermetically sealed to prevent the escape of fission product gases into the pressurized water coolant. As a result heavy walls or other means must be provided to prevent failure of the cladding due to the build-up of internal pressure. One method of minimizing the build-up of excessive pressure due to the development of fission product gases is to provide a gas accumulation chamber which is wholly or partially filled with activated charcoal for the adsorbtion of gases, which chamber is located remote from the fuel proper and which chamber communicates with each fuel element by means of interconnecting conduits and manifolds. Such a construction is shown in U.S. Pat. No. 2,851,409. The disadvantage of such a construction is that the additional parts required including the chamber, the conduits and the manifolds add greatly to the bulk and expense of building such a reactor.

Associated with the foregoing is the necessity of reducing the size of neutronic reactors in order to make them more readily adaptable to broader usage. The elimination of auxiliary equipment such as remote plenum chambers for the collection of fission product gases as well as the interconnecting conduits and manifolds is only part of the task of reducing the size and cost of reactors. If the released fission product gases can be confined to the particular fuel element in which they are generated and at the same time reduce the existing plenum chambers in each rod for the collection of such gases, while minimizing the build-up of internal gas pressure to a safe maximum level, the size and cost of a reactor can thereby be reduced without affecting the power rating of the reactor.

A reduction in the size of a plenum chamber results in appreciable savings from a combination of reduced tubing requirements, reduced pressure vessel length, a reduction in the volume of coolant required, and reduced pumping capacity for the coolant. Larger reductions in plenum chamber sizes result in proportionately higher savings.

It has been found in accordance with this invention that the foregoing problems and disadvantages may be overcome by providing a relatively small plenum chamber for each fuel element which plenum chamber is filled with a monatomic gas adsorber such as activated charcoal, whereby the internal gas pressures are held to a minimum due to the adsorption of the fission product gases, such as xenon and krypton, within the hermetically sealed metal sheath or cladding of the fuel element.

After a brief initial period of use in a recator, the hermetically sealed fuel elements of this invention develop a substantial internal gas pressure, which however is below that of the surrounding water, and thereafter the internal gas pressure rises slowly with use. In prior art sealed fuel elements the internal gas pressure rises continually and eventually surpasses that within the fuel elements of this invention. Consequently the fuel element of this invention maintains a more desirable internal gas pressure level than do the prior are sealed fuel element.

Accordingly, it is a general object of this invention to provide an internal gas adsorption means for nuclear fuel elements so as to enable a fission gas plenum chamber of greatly reduced size.

It is another object of this invention to provide an internal gas adsorption means for nuclear fuel elements which includes the addition of monatomic gas adsorber material within each fuel element for adsorbing fission product gases generated therein.

Finally, it is an object of this invention to satisfy the foregoing objects and desiderata in a simple and effective manner.

SUMMARY OF THE INVENTION

Generally, this invention involves means for controlling the development of destructive internal gas pressures within a hermetically sealed fuel element which means comprises a closed fluid tight metallic sheath having walls forming a fuel containing chamber and a small plenum chamber at the upper end thereof, a plurality of pellets or bodies of fissionable material in end-to-end abutment within the fuel-containing chamber, the bodies having diameters slightly less than that of the internal diameter of the sheath whereby a gas-passage space is provided longitudinally of and communicating with the plenum chamber, and a monatomic gas adsorption material within the plenum chamber, whereby fission product gases are adsorbed within the container to prevent the build-up of excessive internal gas pressure within the container.

BRIEF DESCRIPTION OF THE DRAWINGS

For a better understanding of the invention reference is made to the drawings in which.

DESCRIPTION OF THE PREFERRED EMBODIMENT

Figure 1:
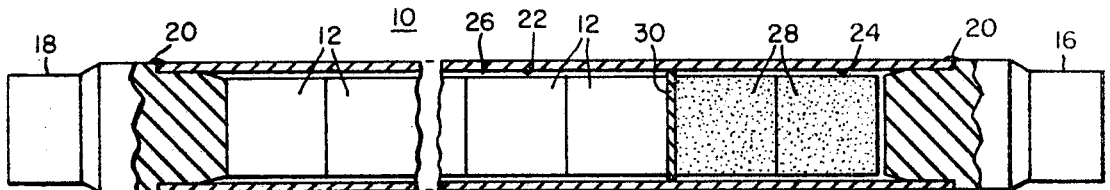
FIG. 1 is a vertical sectional view through a fuel element.

A fuel element in accordance with this invention is generally indicated at 10 in FIG. 1. It is particularly adapted for use in the pressurized-water type of power reactor which may have a rating of up to 1000 megawatts and even higher. The fuel element 10 includes a plurality of circular cylindrical nuclear fuel pellets or bodies 12 disposed in end-to-end abutment within a sheath or tubular cladding 14. The opposite ends of the cladding 14 are closed by end plugs 16 and 18 that are secured in place by annular welds 20 to provide a hermetically sealed casing. A greater portion of the interior volume of the cladding 14 forms a fuel containing chamber 22, while the upper portion of the cladding encloses a relatively small plenum chamber 24.

As shown in FIG. 1 the fuel pellets 12 have a diameter slightly less than the internal diameter of the cladding 14, whereby a cylindrical clearance or gap 26 is disposed between the pellets and the cladding and which gap extends longitudinally of the fuel element and communicates with the plenum chamber 24 at the upper end thereof.

Within the plenum chamber 24 one or more bodies 28 of a gas adsorption material are located and substantially completely fill the plenum chamber 24.

The fuel pellets 12 are composed of a suitable fissionable material, for example uranium dioxide (UO$_2$), which is enriched with approximately 3% U-235, the magnitude of such enrichment however varying with the particular purpose and design of the reactor. Pellets of the oxides, or carbides of thorium, plutonium, or other fissionable elements, or mixtures of two or more materials may be employed.

The cladding 14 is composed of a metal which is substantially inert to the environment of the reactor including the liquid coolant surrounding the fuel elements, as well as being resistant to any corrosive inducing factors such as arising by reason of irradiation from the fuel pellets 12. The cladding 14 may be composed of a zirconium-base alloy such as zircaloy-2 or zircaloy-4, or an austenitic stainless steel such as Type 304. The zirconium base alloys have a lower neutron adsorption factor than the stainless steel. On the other hand, stainless steel cladding has a lower creep rate than zirconium base alloys; stainless steel having a negligible creep rate up to temperatures approaching 1000° F. while zircaloy has a negligible creep rate at temperatures up to about 600° F.

Operable fuel elements 10 in accordance with the invention may have an outside diameter varying from about 0.350 to 0.600 inch and a specific example is 0.422 inch. The length of the fuel element may vary within wide limits and is dependent upon the nuclear reactor for which it is desired. However, where the length would ordinarily be 12 feet including a plenum chamber when devoid of the monatomic gas adsorber, the total length of the element may be reduced by as much as 10 inches by employing a much shorter plenum chamber filled with monatomic gas adsorption material. For a given fuel element for a reactor the pellets 12 have a diameter of from 0.250 to 0.55 inch, the preferred diameter being 0.369 for the 0.422 inch outside diameter sheath inch. The cladding has a thickness varying from about 0.018 to 0.035 inch, a thickness of 0.024 inch being suitable for most uses. The purpose of the clearance space 26 is to allow for the radial thermal expansion of the pellets 12 when the fuel element 10 is at the elevated temperatures of operation of a reactor. At such temperatures the pellets may expand as much as 0.005 inch in which event the clearance space 26 is completely filled and the surfaces of the pellets are in snug and firm contact with the cladding 14 to provide good thermal conductivity. The cladding also expands slightly at the elevated temperatures of operation.

The stainless steel cladding has a normal thickness of from about 0.015 inch but which may be as low as 0.0075 inch depending upon the ultimate internal pressure developed within the cladding.

In a pressurized water reactor more heat can be adsorbed from the fuel element at higher water pressure because the water adsorbs more heat before it reaches the boiling point and is converted to steam. Accordingly, for the greatest efficiency it is desirable that the water coolant be at as high a temperature and pressure as possible.

By way of example, the fuel element of the present invention is designed to function in a pressurized water reactor in which when in operation the water has a pressure of between 2000 and 2250 pounds per square inch. For a given fuel element, at optimum operating conditions the temperature of the center of each pellet 12 is approximately 4200° F. with the surface pellet temperature being approximately 1100° F. The temperature of the inner surface of the cladding 14 is approximately 780° F. and that of the outer surface of the cladding is approximately 657° F. The peak temperature of the coolant water is approximately 649° F.

At those temperatures and pressures the cladding 14 is supported by the thermally expanded pellets 12 so that under normal conditions there is no problem of cladding fatigue strain due to the exceptionally high pressure of 2250 p.s.i. of external water. The problem of cladding fatigue strain occurs due to repeated thermal contraction and expansion of the pellets 12 in response to shutting down and starting up of the reactor because of cyclical power demands such as may occur over a 24 hour period. When the reactor is shut down the pellets 12 contract due to cooling and thereby move out of supporting contact with the inner surface of the cladding. In the absence of internal gas pressure the cladding will sag inwardly, unless it is heavily walled, under the external pressure of the water coolant. Conversely, when the reactor is started up again, the pellets 12 heat up and expand until they come into contact with the cladding. Thus, without some internal gas pressures within the fuel element, the cylindrical radial movement of the cladding in response to heating and cooling of the fuel element, could cause excessive strain, with possible eventual fatigue and rupture of the cladding.

The provision of a controlled amount of internal gas pressure in the fuel element to offset at least a major portion of the external pressure of the pressurized water coolant is desirable to the extent that it eliminates the problem of excessive strain and possible ultimate fatigue failure of the cladding. However, additional pressure is obtained during operation of the fuel element as the UO$_2$ fuel fissions and releases fission product gases such as krypton and xenon which increase the pressure within the fuel element. The solution to the problem is to adsorb these fission product gases by the provision of bodies 28 of monatomic gas adsorber material which may be added either as compacted pellets of convenient handling size or in powder form. Monatomic gas adsorper material has a very large surface area compared to its volume. Such material has a very low density and very high porosity. Examples of such material are activated charcoal, activated alumina ($Al_2O_3$), activated uranium dioxide ($UO_2$), and molecular sieves. Such absorbent material is disposed either in pellet or powder form within the short plenum chamber 24 at the upper end of the fuel element. Where the body 28 of monatomic gas adsorber is in powder form or inclined to form a powder during its use within a neutronic reactor a porous disk 30 may be provided between the lower end of the body 28 and the upper end of the pellets 12 to prevent the powdered adsorber material from moving into and filling the clearance space 26. Such a disk may be composed of sintered compacted material such as alumina or graphite or it may be composed of a metal screen.

Inasmuch as the bodies 28 of high surface area adsorbent material actually adsorb at a given gas pressure more volumes of gas than the volume the material occupies, a smaller plenum chamber 24 yields the same internal pressure as a larger plenum chamber without the bodies of high surface area material. In the alternative, the plenum chamber length may be held constant as compared with a fuel element having no bodies 28 added, and a reduced internal gas pressure may be obtained by the use of such bodies.

The technique of using the bodies 28 of monatomic gas adsorption material, such as activated charcoal, has the added advantage of acting as a buffer to minimize fluctuations in internal gas pressure. For example, early in the life of operation of a fuel element when the fission gas release is low, the internal gas pressure is higher than that without activated charcoal since low adsorption occurs because the pressure is low. Therefore it is desirable to have internal pressure build up rapidly to offset the high external pressure in the pressurized water reactor and thereby reduce the creep or sag of the zircaloy cladding onto the pellets 12. Later in the life of operation however, as the internal pressure increases, the activated charcoal will adsorb proportionately more gas thereby reducing clad stress and strains due to internal pressure.

Figure 2:
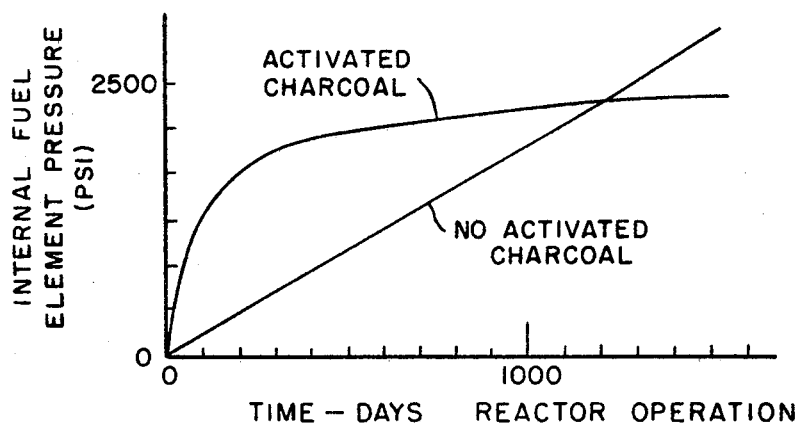
FIG. 2 is a graph of internal fuel element pressure versus time.

A comparison of a fuel element internal pressure phenomena having activated charcoal and no activated charcoal is shown in FIG. 2. As indicated the internal pressure increases substantially on a straight line basis where no adsorbent such as activated charcoal is present. However, where activated charcoal is used the internal pressure of the fuel element increases during the early life period of operation and then decreases asymptotically throughout the remainder of the life of the fuel element.

A monatomic gas absorption material such as activated charcoal has an extremely large surface area which is effective in adsorbing lamp quantities of relatively condensable noble fission product gases such as krypton and xenon. It has been calculated that for every 100 atoms of uranium that fissions there are produced about 30 atoms of xenon and krypton which can diffuse out of the $UO_2$ fuel and build-up a gas pressure within the fuel element cladding. For that reason a plenum chamber which is devoid of fissionable material is provided for the accumulation of the gases in order to prevent the internal gas pressure from exceeding the external pressure of 2250 p.s.i. If the internal pressure were to exceed the external pressure the cladding would creep radially outwardly to cause enlargement of the clearance 26 between the fuel pellets 12 and the cladding 14 and thereby reduce the heat exchange relationship through the cladding which in turn would increase the temperature of the fuel element and thereby result in the release of more gas which would eventually rupture the cladding.

Inasmuch as activated charcoal is more effective at lower temperatures than at higher temperatures it is preferable that the plenum chamber 24 be disposed at one end of the fuel element rather than centrally thereof where the temperature are higher. Furthermore it is emphasized that activated charcoal which has an extremely large surface area percent weight is an effective monatomic gas adsorber material and that graphite, which is frequently used in association with the fuel elements (though normally not within a fuel element), is a moderator material and because of its high density and low surface area is not an effective monatomic gas adsorber.

Calculations based on experimental data of the end-of-life pressures of fuel elements with and without activated charcoal are shown in the table.

TABLE—END-OF-LIFE INTERNAL PRESSURE OF A FUEL ELEMENT

|  | No activated charcoal p.s.i. | Activated [1] charcoal p.s.i. |
|---|---|---|
| End-of-life pressure (normal operation, no overpower) | 2,250 | 1,262 |
| End-of-life pressure (overpower, releases 50% fission gases or equivalent gaseous impurities) | [2] 3,375 | 1,455 |

[1] Conservative calculations, assume zero krypton adsorptoin and 33% less xenon adsorption than best available data.
[2] Probable failure.

It is readily evident that the addition of activated charcoal greatly reduced the end-of-life internal pressure of the fuel element. Thus, under normal operations without testing for overpower a pressure of 2250 p.s.i. was developed where no charcoal was added as compared with 1262 p.s.i. where activated charcoal was used. Similarly, where the reactor was operated at overpower conditions so that a greater percentage of fission gases were developed, a pressure of 3375 p.s.i. was developed in a fuel element having no activated charcoal as compared with only 1455 p.s.i. for the fuel element containing activated charcoal.

In view of the foregoing it is readily evident that where a monatomic gas adsorber such as activated charcoal is used the build-up of excessive pressures can be prevented in the event of an anomaly in operation such as the failure of a control rod to be actuated, which would normally increase the internal pressure build-up by releasing higher percentages of xenon and krypton and other gases impurity forming materials such as nitrides.

Figure 3:
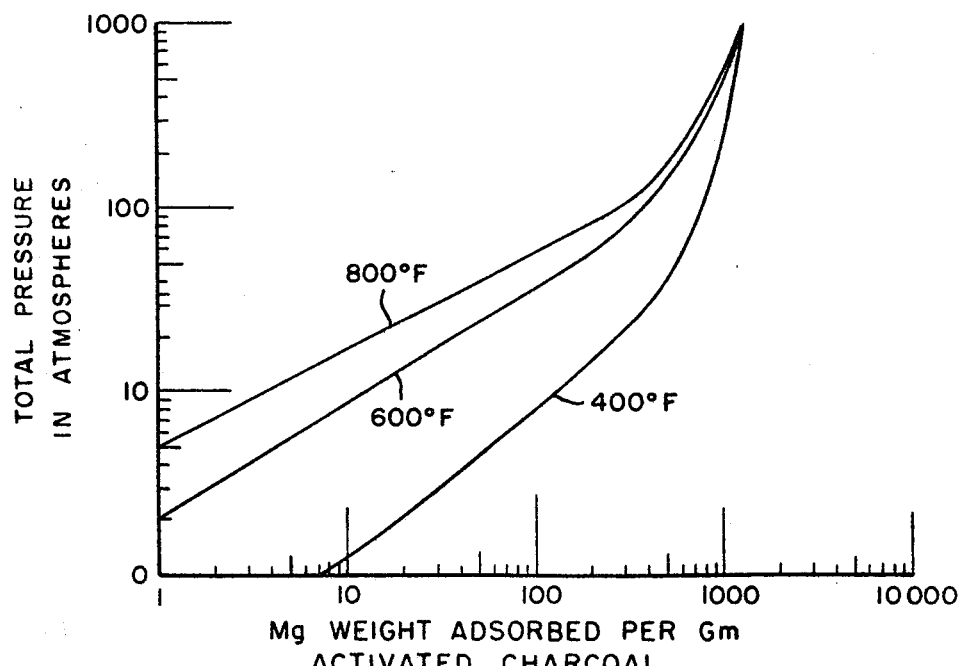
FIG. 3 is a graph of internal gas pressure versus milligrams of gas adsorbed per gram of activated charcoal for various temperatures.

Experiments investigating the effect of temperature on the adsorption power of activated charcoal were also made. The results are shown in FIG. 3 wherein it is indicated that at lower temperatures of operation such as 400° F. as compared with 800° F. greater quantities of xenon and krypton are adsorbed by activated charcoal and thereby minimize the total internal pressure created within a fuel element. FIG. 3 also demonstrates that the adsorption of xenon and krypton increases greatly with increasing gas pressure.

Accordingly the device of the present invention satisfies the problem of avoiding the development of internal pressures within a fuel element which have varying detrimental effects depending upon the conditions of operation of a reactor. Finally, the use of a monatomic gas adsorber within a hermetically sealed fuel element constitutes a safety factor by avoiding the development of excessive internal pressures wherein, in an anomaly condition, a particular reactor fails to operate in the manner expected.

Various modifications may be made within the spirit of the invention.

What is claimed is:

1. In a pressurized water nuclear reactor a fuel element comprising a hermetically sealed metallic container having walls forming a fuel-containing chamber and a plenum chamber, a body of fissionable material within the fuel-containing chamber, gas passage means extending between the chambers, and a body of monatomic gas adsorber within the plenum chamber, whereby fission product gas pressure within the container is controlled.

2. The fuel element of claim 1 in which the body of monatomic gas adsorber is composed of a material selected from a group consisting of activated charcoal, activated alumina, activated uranium dioxide.

3. The fuel element of claim 1 in which the container is composed of a zirconium base alloy, and in which the body of monatomic gas adsorber is activated charcoal.

4. The fuel element of claim 1 in which the metallic container is a cylindrical tube, in which the bodies of fissionable material are cylinders having a diameter slightly less than that of the internal wall of the tube and in which the body of gas adsorber is disposed at the upper end portion of the tube.

References Cited

UNITED STATES PATENTS

| | | | |
|---|---|---|---|
| 2,851,409 | 9/1958 | Moore | 176—79 X |
| 3,135,665 | 6/1964 | Koutz et al. | 176—37 X |
| 3,141,829 | 7/1964 | Fortescue et al. | 176—68 |
| 3,231,476 | 1/1966 | Thome | 176—37 X |
| 3,238,105 | 3/1966 | McNelly | 176—68 X |
| 3,252,869 | 5/1966 | Koutz | 176—68 |
| 3,274,066 | 9/1966 | Zumwalt | 176—68 |
| 3,275,522 | 9/1966 | Kinsey et al. | 176—68 X |
| 3,278,386 | 10/1966 | French et al. | 176—37 |
| 3,356,585 | 12/1967 | Zebroski | 176—68 |
| 3,378,458 | 4/1968 | Ross et al. | 176—68 X |

CARL D. QUARFORTH, Primary Examiner

M. J. SCOLNICK, Assistant Examiner